United States Patent Office 3,485,862
Patented Dec. 23, 1969

3,485,862
BICYCLO AND AROMATIC SILICON-FLUORINE COMPOUNDS AND METHODS OF PREPARATION
John L. Margrave, c/o Rice University, Houston, Tex. 77001, and Peter L. Timms, c/o Chemistry Dept., University of California, Berkeley, Calif. 94720
No Drawing. Filed Sept. 8, 1966, Ser. No. 577,812
Int. Cl. C07f 7/14; C07d 103/02; C08f 35/02
U.S. Cl. 260—448.2      16 Claims

ABSTRACT OF THE DISCLOSURE

Novel compounds are described and claimed including bicyclo compounds containing one or more silicon-silicon bonds and having the formula $C_6H_5X(SiF_2)_n$, where X is H, $CH_3$ or F; and aromatic compounds of the formula $C_6H_{6-m}F_m(SiF_2)_n$, where $m$ may be an integer from 1 to 6 and $n$ may be 1, 2 or 3. The compounds of this invention are prepared by reacting silicon difluoride with fluorinated or non-fluorinated monocarbocyclic aromatic compounds. The reaction occurs when a mixture of gaseous silicon difluoride and a vaporized aromatic reactant are condensed, for example, at liquid nitrogen temperatures. The novel compounds are useful as anti-oxidants and flame retardants. The bicyclo compounds are also unconjugated dienes capable of copolymerization with olefins.

---

This invention relates to novel fluorine compounds and to methods for preparing such compounds. More particularly, it is concerned with compounds made by the reaction of silicon difluoride with monocarbocyclic aromatic compounds.

It is a principal object of the present invention to provide the hereinafter described fluorine compounds. It is another object of the invention to provide processes for the preparation of such fluorine compounds. Other objects will be apparent from the following detailed description of our invention and the appended claims.

The compounds of our invention are prepared by reacting silicon difluoride with fluorinated or non-fluorinated monocarbocyclic aromatic compounds. Stated broadly, the reaction occurs when a mixture of gaseous silicon difluoride and the vaporized aromatic reactant are condensed, for example, at liquid nitrogen temperatures.

Gaseous silicon difluoride may be produced in the manner disclosed in U.S. Patent 2,840,588 to Pease by passing silicon tetrafluoride over silicon at about 1050° C. and at pressures of the order of a few millimeters of mercury. The reactant aromatic compound is vaporized into the silicon difluoride gas stream.

The temperature of condensation is not critical but should be less than the temperature of condensation of silicon difluoride (—80° C.). The gaseous reaction mixture is preferably condensed in a trap cooled by liquid nitrogen (—196° C.). Silicon difluoride exhibits very little chemical reactivity in the gas phase and substantially all of the reaction with the reactant aromatic compound is believed to occur in the liquid phase after condensation.

Silicon difluoride abstracts fluorine from perfluorobenzene and gives mono-, bis-, and trisfluorosilylfluorobenzenes as well as disilyl and higher derivatives. The mono-$SiF_2$ product probably involves a three-membered ring with a hexadiene system. The system then rearranges exothermically to regain aromaticity in the ring, rather than adding more silicon difluoride to form bridged species. The spontaneous rearrangement, accompanied by visible flashes of light, is attributed to the difference between silicon-fluorine and carbon-fluorine bond energies.

Silicon difluoride adds 1,4 to benzene to give unusual bridged compounds with varying numbers of silicon difluoride groups linked across the aromatic ring in the para position. The most abundant product, $C_6H_6(SiF_2)_3$, accounted for about 20% of the reacted benzene and was assigned the formula:

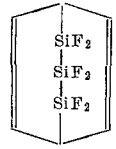

2,2,3,3,4,4-hexafluoro - 2,3,4 - trisilabicyclo[3,2.2.]nona-6,8-diene

Toluene, and to some extent mono- and difluorobenzene, give a similar reaction to form bridged products. In addition to 1,4-addition, silicon difluoride abstracts a very limited amount of nuclear substituted fluorine from mono- and difluorobenzene.

In its broadest process aspect, our invention is a method of making (1) monocarbocyclic aromatic fluorine compounds which comprises vaporizing a monocarbocyclic aromatic compound into a gaseous stream of silicon difluoride, cooling and thereby condensing the gaseous mixture, and recovering the thus produced monocarbocyclic aromatic fluorine compounds from the resultant condensate, and (2) novel bridge-compounds of the formula $C_6H_5X(SiF_2)_n$ wherein X is H, $CH_3$ or F, and $n$ is an integer from 1 to 8.

In a more specific process and composition aspect, our invention relates to the preparation of perfluorophenyltrifluorosilane, bis - (trifluorosilyl)perfluorobenzene and tris-(trifluorosilyl)perfluorobenzene, and of 2,2,3,3,4,4-hexafluoro-2,3,4-trisilabicyclo[3.2.2] - nono-6,8-diene and related compounds.

Perfluorophenyltrifluorosilane ($C_6F_5SiF_3$), bis-trifluorosilyl)perfluorobenzene ($C_6F_4Si_2F_6$) and tris-(fluorosilyl)perfluorobenzene ($C_6F_3Si_3F_9$) and the other monocarbocyclic aromatic substituted trifluorosilane compounds of our invention behave similarly to phenyltrichlorosilane in forming oxidation-resistant polymers on hydrolysis. These compounds can also be added to difunctional silanes to act as cross-linking agents on hydrolysis. The incorporation of fluorine into the aromatic nucleus yields flame-proof resins of increased stability suitable for use as flame retardant coatings for wood, fabrics and other materials. See page 103 of Rochow, An Introduction to the Chemistry of Silicones, 2nd edition, Wiley, New York (1951).

The monocarbocyclic aromatic substituted trifluorosilane compounds of our invention are also useful as intermediates in the preparation of fluorinated aromatic compounds by defluorination. For example, the overall reaction of perfluorobenzene with silicon difluoride followed by hydrolysis with 10% hydrofluoric acid results in the replacement of a nuclear fluorine by hydrogen as illustrated:

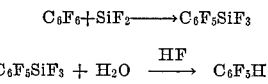

The silicon difluoride-bridged products of our invention yield polymers which can be deposited on metals or copolymerized with other materials to form oxidation— and corrosion-resistant coating stable at elevated temperatures and resistant to the action of fluorine-containing compounds. The silicon difluoride-bridged compounds of our invention are also unconjugated dienes capable of copolymerization with unsaturated olefins, such as ethylene or propylene, and vinyl compounds, such as vinyl fluoride, vinyl chloride, acrylonitrile and the like.

The following examples are illustrative of our invention.

GENERAL EXAMPLE

Silicon difluoride was prepared as described at 1050° C. from silicon and silicon tetrafluoride at a rate of 5–20 g./hour. The mixture of silicon difluoride and aromatic compound was pumped through a trap cooled at liquid nitrogen temperature. The pressure in the system between the furnace and the trap was maintained below 0.2 mm. Higher pressures caused heavy deposits of scaly polymers to build up on the walls of the system with resultant loss of product and also of pumping efficiency.

The resultant condensates were generally dark brown or red colored at low temperatures but changed to plastic yellow solids on warming to above about −50° C. At least 70% of the aromatic reactant could be recovered unchanged by pumping on the solid at room temperature. The best conversion of the aromatic reactant was obtained if care was taken to condense the silicon difluoride and the aromatic reactant at identical levels in the trap. In some cases volatile silicon-containing products could be pumped out of the solid polymers at room temperature in addition to the excess aromatic reactant, but generally it was necessary to heat the polymer to 100–140° C. to liberate appreciable amounts of volatiles.

Purification of the compounds distilled out of the polymers was achieved by a combination of conventional vacuum techniques and gas chromatography. Short columns packed with 25% Kel-F 10 (polytrifluorochloroethylene) on silicon-treated Chromosorb W were found most satisfactory for both the high-boiling benzene and toluene reaction products and the much more voltatile perfluorobenzene products.

Initial analysis was carried out using a Bendix time-of-flight mass spectrometer. The reaction products were found to give well defined molecular ions, facilitating interpretation. Infrared spectra were taken on a Beckmann IR-9 instrument, ultraviolet spectra on a Bausch and Lomb Spectronic 505 spectrophotometer, and proton and fluorine N.M.R. spectra on Varian A–60 and HR–60 machines, respectively.

EXAMPLE 1

Perfluorobenzene and silicon difluoride

Cocondensation of silicon difluoride and perfluorobenzene at −196° C. gave a brown solid. Intermittent blue light flashes were observed during condensation and when the condensate was subsequently allowed to warm to about −150° C. Distillation of the final yellow-brown polymer at +120° C. gave a coloreless liquid which was separated into three main fractions.

(A) The lowest boiling fraction after gas chromatographic separation and purification was found to be the compound perfluorophenyltrifluorosilane or mono(trifluorosilyl)perfluorobenzene ($C_6F_5SiF_3$). The structure was suggested by its infrared spectrum and was confirmed by mass spectrometric and fluorine N.M.R. studies. The infrared spectrum contained the strong ring vibration and C–F stretch at 1491 and 1000 cm$^{-1}$ respectively, typical of the perfluorophenyl group. The mass spectrum was analogous to that of perfluorotoluene with a large ion at m/e 186 and 252 corresponding to $C_6F_6+$ and $C_6F_8Si+$, the molecular ion, respectively. The fluorine N.M.R. spectrum showed four resonances. The multiplets at 125.3, 143.8 and 159.8 p.p.m. (relative to $CCl_3F$) were in fairly usual positions for ortho, para, and meta fluorines in substituted perfluorobenzenes, while the resonance at 134.8 had the correct relative area to be due to an —SiF$_3$ group split into a triplet by the two ortho fluorine atoms.

Perfluorophenyltrifluorosilane boils at 105° C. It is thermally stable to at least 300° C., but is readily hydrolysed by trace amounts of water to polymeric materials. Dilute hydrofluoric acid converts it almost quantitatively to pentafluorobenzene.

(B) The second fraction obtained on distillation of the reaction product was shown by mass spectrometry, N.M.R. spectroscopy, and by hydrolysis with hydrofluoric acid to be mainly a mixture of the three position isomers of perfluorophenylene-difluorosilane or bis(trifluorosilyl) perfluorobenzene, $C_6F_4(SiF_3)_2$, the o:p:m ratio. ratio being roughly 1:6:9. The mass spectrum showed principal ions at m/e 186 ($C_6F_6+$) and 318 ($C_6F_{10}Si_2$) while the fluorine N.M.R. spectrum showed a very strong multiplet at 135 p.p.m. (due to —SiF$_3$ groups) plus several weaker multiplets mostly in the region of the resonances in $C_6F_5SiF_3$. Hydrolysis with 10% HF gave some $C_6F_5H$ (probably from small amounts of $C_6F_5SiF_3$ or possibly $C_6F_5Si_2F_5$ present), together with ortho, meta, and para —$C_6F_4H_2$, and traces of sym-$C_6F_3H_3$. The conversions appeared to be essentially quantitative and the relative amounts of the different $C_6F_4(SiF_3)_2$ isomers in the initial reactions product were estimated from the relative peak area ratios of the tetrafluorobenzenes obtained after separation on a gas chromatographic column packed with 10% tricresyl phosphate on Chromosorb W using a thermal conductivity detector.

(C) The least volatile fraction was shown mass spectrometrically to contain a compound of molecular formula $C_6F_{12}Si_3$ identified as tris-(trifluorosilyl) perfluorobenzene and most likely the sym-isomer. This fraction also contained a compound of the formula $C_6F_{14}Si_4$. The evolution of hydrogen on hydrolysis with 10% HF suggested the presence of Si—Si bonds, and the fraction was probably a mixture of poly-SiF$_3$ substituted perfluorobenzenes, and related compounds containing —$Si_2F_5$ and perhaps —$Si_3F_7$ side chains. Overall, about 60% of the perfluorobenzene that underwent reaction with the silicon difluoride was recovered as volatile perfluorobenzene derivatives.

EXAMPLE 2

Benzene and silicon difluoride

No light was emitted when silicon difluoride and benzene were condensed at −196° C. On warming to room temperature, a bright yellow soft polymer was obtained which liberated excess benzene, appreciable amount of perfluorotetrasilane, and trace amounts of a compound with molecular formula $C_6H_6Si_2F_4$. Distillation of the polymer at 140° C. under vacuum gave a mixture of white or yellow liquids and solids.

Mass spectrometric studies of the distillate showed that it contained a series of compounds of the formula $C_6H_6(SiF_2)_n$ wherein $n=1$ to at least 8; at very low electron voltages the mass spectrum contained only the ions of m/e values corresponding to $C_6H_6+$ and

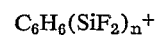

$$C_6H_6(SiF_2)_n{}^+$$

The most abundant species in the series, $C_6H_6Si_3F_6$, was isolated and obtained as colorless crystals melting at 72.5° C. by sublimation from the solid/liquid distillate at 100° C. under high vacuum.

The structure 2,2,3,3,4,4-hexafluoro-2,3,4-trisilabicyclo-[3.2.2]nona-6,8-diene has been assigned to $C_6H_6Si_3F_6$. The structure was suggested by the proton N.M.R. spectrum which showed two resonances, a triplet at 2.15 p.p.m., and a broad singlet at 4.74 p.p.m. on the high field side of the solvent benzene. The area ratios were very close to 2:1. This proton spectrum is of the same type as that observed for the compound 2,2,4,4-tetramethyl-3-oxa-2,4-disilabicyclo[3.2.2]nona-6,8-diene. The fluorine N.M.R. spectrum showed two main lines at 130 and 134 p.p.m. on the high field side of $CCl_3F$ with an area ratio of 1:2, and a third weaker line, considered to be an impurity, at 117 p.p.m. The spectrum suggests a 4:2 distribution of fluorine atoms as required by the silicon bridge. Hydrolysis of $C_6H_6Si_3F_6$ with dilute hydrofluoric acid, or with 2 N KOH( gave mainly 1,4-cyclohexadiene. The infrared and ultraviolet spectra of the compound showed conclusively that it does not contain a conjugated carbon-carbon double bond system.

EXAMPLE 3

Toluene and silicon difluoride

In a procedure similar to that of Example 2, toluene was found to give a series of compounds of the formula $CH_3C_6H_5(SiF_2)_n$ wherein $n=1$ to at least 4. The compounds are liquids which exhibited properties similar to those of the related benzene compounds.

EXAMPLE 4

Mono- and difluorobenzene and silicon difluoride

Monofluorobenzene and p-difluorobenzene resemble both benzene and perfluorobenzene in their reactions with silicon difluoride. Very infrequent light flashes were observed during the cocondensation of both mono- and difluorobenzene with silicon difluoride at $-196°$ C. The reaction with monofluorobenzene gives a polymer, a very small yield of phenyltrifluorosilane and some less volatile compounds of the formula $FC_6H_5(SiF_2)_n$ where $n=2$ to 4 as shown by mass spectrometric analysis. The latter, yield benzene and a monofluoro-1,4-cyclohexadiene on hydrolysis and are probably partly bridged, unsaturated compounds. p-Difluorobenzene reacts similarly to produce a very small amount of 4-fluorophenyltrifluorosilane together with compounds of the formula $F_2C_6H_4(SiF_2)_n$ which, on hydrolysis with 10% HF, give monofluorobenzene and difluoro-1,4-cyclohexadiene derivatives.

We claim:

1. Bicyclo-compounds of the formula $C_6H_5X(SiF_2)_n$ wherein X is H, $CH_3$ or F, and $n$ is an integer from 2 to 8, 2 to 4 and 1 to 4, respectively.
2. Bicyclo-compounds according to claim 1 wherein X is H and $n$ is 2 to 8.
3. Bicyclo-compounds according to claim 1 wherein X is $CH_3$ and $n$ is 2 to 4.
4. Compounds according to claim 1 wherein X is F and $n$ is 2 to 4.
5. 2,2,3,3,4,4-Hexafluoro - 2,3,4 - trisilabicyclo[3.2.2] nona-6,8-diene.
6. A method of making monocarbocyclic aromatic fluorine compounds which comprises vaporizing a partially fluorinated monocarbocyclic aromatic compound into a gaseous stream of silicon difluoride, cooling and thereby condensing the gaseous mixture, and recovering the thus produced trifluorosilyl substituted monocarbocyclic aromatic fluorine compounds from the resultant condensate.
7. A method of making bicyclo-compounds containing silicon-silicon bonds, said compounds having the formula $C_6H_5X(SiF_2)_n$ wherein X is H, $CH_3$ or F, and $n$ is an integer from 2 to 4, which comprises vaporizing a compound of the formula $C_6H_5X$ wherein X is H, $CH_3$ or F, into a gaseous stream of silicon difluoride, cooling and thereby condensing the gaseous mixture and recovering the thus produced $C_6H_5X(SiF_2)_n$ compounds from the reaction mixture.
8. A method of making perfluorobenzene compounds wherein 1–3 of the nuclear substituted fluorine atoms of perfluorobenzene are replaced by a trifluorosilyl group which comprises vaporizing perfluorobenzene into a stream of gaseous silicon difluoride, cooling and thereby condensing the gaseous mixture and recovering mono-, bis- and tris-(trifluorosilyl)perfluorobenzene from the resultant condensates.
9. Compounds wherein 1–3 of the nuclear substituted fluorine atoms of perfluorobenzene are replaced by a trifluorosilyl group.
10. Mono - (trifluorosilyl)perfluorobenzene, a compound according to claim 9 wherein one of the nuclear fluorine atoms has been replaced.
11. Bis-(trifluorosilyl)perfluorobenzene, compounds according to claim 9 wherein two of the nuclear fluorine atoms have been replaced.
12. Tris - (trifluorosilyl)perfluorobenzene, compounds according to claim 9 wherein three of the nuclear fluorine atoms have been replaced.
13. A method of making aromatic and bicyclo fluorine compounds which comprises vaporizing a partially fluorinated monocarbocyclic aromatic compound having the formula $C_6H_{6-m}F_m$ where $m$ is an integer from 1 to 2 into a gaseous stream of silicon difluoride, cooling and thereby condensing the gaseous mixture and recovering from the condensed reaction product: (a) trifluorosilyl substituted monocarbocyclic aromatic fluorine compounds having at least one nuclear substituted fluorine replaced by a trifluorosilyl radical; and (b) bicyclo compounds of the formula $C_6H_{6-m}F_m(SiF_2)_n$ where $m$ is an integer from 1 to 2 and $n$ is an integer from 2 to 4.
14. The method of claim 13 wherein said partially fluorinated monocarbocyclic aromatic compound is $C_6H_4F_2$ and wherein the condensed reaction product is an aromatic fluorine compound of the formula $$FC_6H_4SiF_3$$

15. The method of claim 13 wherein said partially fluorinated monocarbocyclic aromatic compound is $C_6H_4F_2$ and the condensed reaction product is an aromatic fluorine compound of the formula $C_6H_4(SiF_3)_2$.
16. The method of claim 13 wherein said partially fluorinated monocarbocyclic aromatic compound is $C_6H_5F$ and wherein the condensed reaction product is an aromatic fluorine compound of the formula $C_6H_5SiF_3$.

References Cited

UNITED STATES PATENTS

| | | | |
|---|---|---|---|
| 2,713,063 | 7/1955 | Sommer | 260—448.2 |
| 2,840,588 | 6/1958 | Pease | 260—448.2 |
| 3,067,230 | 12/1962 | Silva et al. | 260—448.2 |
| 3,128,297 | 4/1964 | Kanner et al. | 260—448.2 |
| 3,200,137 | 8/1965 | Omietanski et al. | 260—448.2 |
| 3,269,928 | 8/1966 | Haszeldine et al. | 260—448.2 XR |
| 3,270,070 | 8/1966 | Haszeldine et al. | 260—448.2 XR |
| 3,281,426 | 10/1966 | Van Dyke | 260—448.2 XR |

OTHER REFERENCES

Chem Abstr. 58: P9138b.
Chem. Abstr. 54: 20932c.
Chernyshev et al.: Chem Abstr., Mar. 15, 1965.

DANIEL E. WYMAN, Primary Examiner

P. F. SHAVER, Assistant Examiner

U.S. Cl. X.R.

106—14, 15; 117—135.1; 252—8.1, 389, 400; 260—827, 46.5

UNITED STATES PATENT OFFICE
CERTIFICATE OF CORRECTION

Patent No. 3,485,862          Dated December 23, 1969

Inventor(s) John L. Margrave and Peter L. Timms

It is certified that error appears in the above-identified patent and that said Letters Patent are hereby corrected as shown below:

Column 1, line 6, after "94720" insert -- assignors to R. I. Patents, Inc., Houston, Texas, a corporation of Texas --

SIGNED AND SEALED

JUL 21 1970

(SEAL)
Attest:

Edward M. Fletcher, Jr.
Attesting Officer

WILLIAM E. SCHUYLER, JR.
Commissioner of Patents